(No Model.)

C. LA DOW.
IMPLEMENT FOR AGRICULTURAL PURPOSES.

No. 360,310. Patented Mar. 29, 1887.

Witnesses:
C. C. Davidson
Lloyd B. Wight

Charles La Dow
Inventor
by his Attorney
Baldwin, Hopkins & Peyton

UNITED STATES PATENT OFFICE.

CHARLES LA DOW, OF ALBANY, NEW YORK.

IMPLEMENT FOR AGRICULTURAL PURPOSES.

SPECIFICATION forming part of Letters Patent No. 360,310, dated March 29, 1887.

Application filed December 3, 1886. Serial No. 220,601. (No model.)

*To all whom it may concern:*

Be it known that I, CHARLES LA DOW, a citizen of the United States, residing at Albany, in the county of Albany and State of New York, have invented certain new and useful Improvements in Implements for Agricultural Purposes, designed especially to turn and stir the soil and to turn and shake out matted hay and other substances, of which the following is a specification.

Heretofore disk implements have been made with the disks arranged either in two gangs (one gang being set to counteract the side-thrust of the other) or they have been made in one gang with guides, cutters, or other devices to prevent the machine from traveling sidewise in its progress. When two opposing disk-gangs are used, either a furrow or ridge is made and left between the gangs, or when one gang is used with guides or cutters to make the gang travel in a direct line the expense of the machine is considerably increased.

This invention is designed to thoroughly pulverize the soil and throw all the furrows in one direction, and be free from the objections previously referred to.

This invention is also designed to turn hay in the same manner, and its smooth-edged circular wheels do not clog when turning either soil or hay, and on account of the circular form of the disks and their being revolved across the line of travel they have no tendency to swerve from a direct line.

Figure 1:
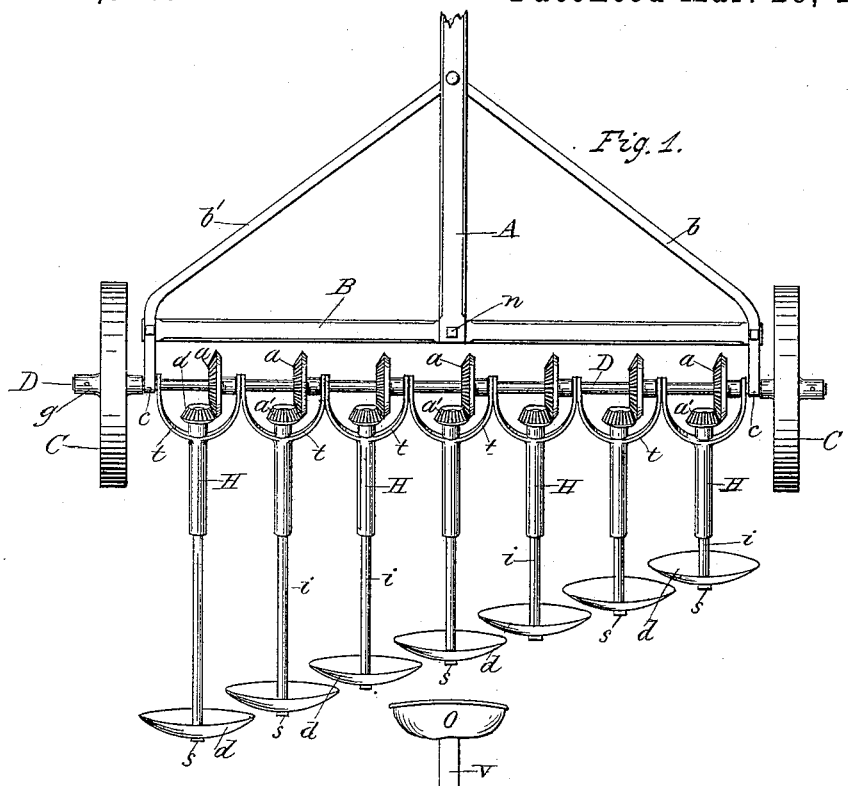
Figure 2:
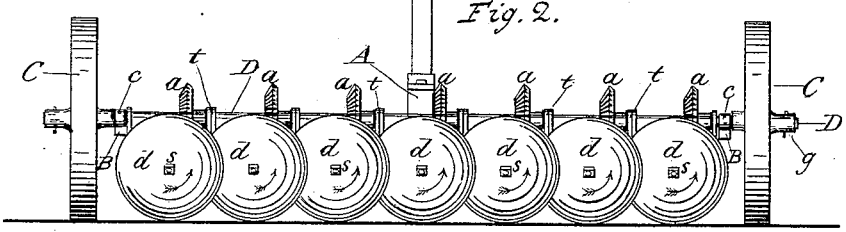
Figure 3:
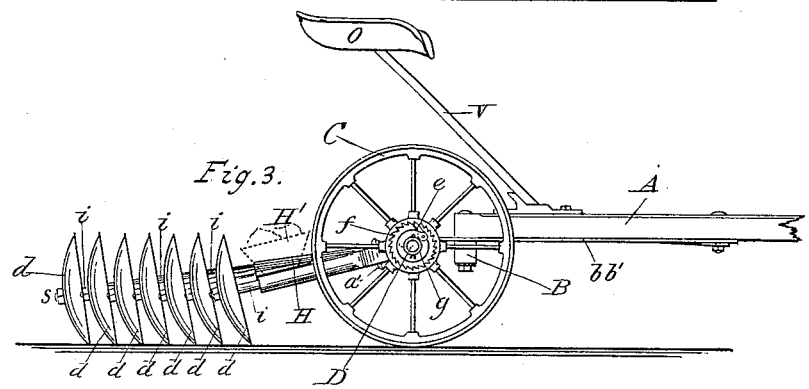

In the drawings, Figure 1 represents a top view of my invention. Fig. 2 represents a rear view, showing by arrows on the disks the direction in which they revolve. Fig. 3 represents a side view of my invention, in which—

A is the pole; B, the cross-bar; b b, the braces; C C, the carrying and driving wheels, and D a revolving axle, which is rotated by a backing-ratchet in each wheel.

The rear ends of the braces b b terminate in eyes which loosely grasp the axle.

H H are drag-bars, which are cored out to receive the spindles i i. These drag-bars are loosely attached to the axle by forks t t, so as to permit the drag-bars to articulate freely up and down at their rear ends independently of each other, so that their attached disks may conform to the surface over which they are drawn.

The disks, however, may be attached to a draft-frame in other ways than by drag-bars. The front end of each spindle is provided with a small bevel-gear, a', which engages with the larger gear, a, which is rigidly attached to the axle D. The rear end of each spindle i is provided with a concavo-convex disk, rigidly attached thereto, and said disk rests upon the ground, and consequently is the only support which governs the vertical position of the rear end of the drag-bar and spindle.

It will be observed that as the disk is hung on the drag-bar it has free vertical movement, and that the concave side of the disk presents a slanting surface to the soil before it, so that as the disk is drawn forward the suction produced by its shape (when brought into contact with the soil) will cause the disk to draw down into the ground, or when drawn over hay to adhere to it more closely than if the disk is of other form or was hung differently. It will also be observed that as the machine is drawn forward the driving-wheels and their attached mechanism cause all the disks to revolve in one common direction, which is across the path of the machine, and deliver the substance that is loosened or turned by the disks to one side thereof, and in such manner that the last disk of the series is the only one which leaves a furrow, which furrow is filled by the leading disk of the series at the next transit of the machine, so that a plowed field or a meadow of mown hay can be worked over with this implement in such manner that the surface shall be left smooth, without furrows, ridges, or paths. It will also be observed that as the earth or hay fills the concave side of the disk equally from all points which have contact with the ground all pressure against the disk is directly rearward. Consequently all the disks turn any loosened substances in one common direction and without any tendency to swerve sidewise during the operation. It will also be observed that the axis on which the disks articulate is higher than the center of the disks. Therefore the front end of the drag-bars inclines upward from the disks, and this tends to give more suction to the disks than is afforded by their concave form, thereby causing the disks on short drag-bars to have as great turning power as those that are mounted on longer drag-bars.

The drag-bars may, however, be provided with boxes for holding weights to enforce the cut of the disk, as shown by dotted lines in Fig. 3.

Springs or other well-known devices may, however, be substituted to enforce the cut of the disks; or the disks may be held down and also raised clear of the ground by a pressure bar or lever in any such well-known way as in common use for depressing or raising the teeth of grain-drills, hay-rakes, seeders, &c.

The disks are preferably arranged to overlap one another, so that the leading disk shall open a furrow or path for the following one to fill, and space is left for the turned material to pass between the disks; but, if desired, they may be arranged in other ways.

The disks are preferably revolved by gearing located directly on the axle, as shown; but they may be revolved in other ways. The size of the disks, the depth to which they are concaved, the speed at which they revolve, and the extent to which they overlap each other are details which may be varied without departing from the scope of my invention, and they may be arranged so that they may rise or fall, either in two series or as one body, by any such well-known means as are in common use in hay-rakes for causing all the teeth to rise and fall simultaneously.

The driving-wheels C C may be transposed, and in such case the dogs $e\ e$ in each wheel-hub will not engage with the ratchet-wheel $f$, and the disks may then be drawn forward without being revolved continuously, and when so operated they stir the earth the same as an ordinary shovel cultivator-tooth; but they have the advantage of being adapted to be partially rotated occasionally in their socket-bearings, so as to distribute the wear of their edge to all sides of the disk equally, and when thus operated they form very efficient and durable teeth. The disks may be thus occasionally and partially rotated by revolving the axle slightly in its bearing $c\ c$, which can be done with a wrench acting against the linchpin $g$.

The disks $a$ are preferably affixed to their spindle $i$ by means of a nut, S, on the convex side of the disk and a similar check-nut or collar on the spindle at the concave side of the disk.

The leading disk is preferably arranged to cover the track made by the right-hand wheel, so that the field can be left perfectly free from paths, furrows, or ridges. This implement can be used as a plow, harrow, cultivator, or general pulverizer, and any well-known seeding device can be mounted above and operated in connection with the disks, which are adapted to cover grain and fertilizers either in drills or broadcast.

When grain is to be sown in drills, it should be dropped through a tube in rear of each disk; but when it is to be sown broadcast it should be scattered in front of the disks.

This implement can also be used as a hay-tedder, the disks turning and stirring the hay in the same manner as they operate on the soil.

Having thus described my invention, I claim broadly—

1. In an agricultural implement, a draft-frame, a vertically-moving drag-bar, and a concavo-convex disk on the drag-bar, (the disk forming the sole support for the rear end of the drag-bar, and having its concave side presented at right angles to and facing the draft, so that the material acted upon will be drawn into and be turned by said front concave side,) in combination with mechanism for rotating the disk.

2. In an agricultural implement, a draft-frame and a series of concavo-convex disks attached to the draft-frame with their concave faces toward the draft and arranged at right angles thereto, the disks forming the sole support for the rear end of the frames upon which they are mounted, and being adapted to turn the material acted upon with their front sides only.

3. In an agricultural implement, a draft-frame, in combination with a series of revolving disks attached thereto, and having their front edges placed at right angles to the draft and arranged so that one disk shall by its revolution open a leading furrow which shall be filled by the next following disk.

4. In an agricultural implement, a draft-frame, a revolving axle, and revolving disks having continuous cutting-edges, in combination with the mechanism on the axle and attached to the disk for revolving them at substantially a right angle to the line of draft.

5. In an agricultural implement, a draft-frame and a disk, $d$, in combination with the spindle $i$, socket H, in which the spindle swivels, revolving axle D, and gears $a\ a'$.

6. In an agricultural implement, a draft-frame and disks $d\ d$, in combination with spindles $i\ i$, of unequal lengths, operating independently of each other.

7. In an agricultural implement, a draft-frame, a drive-wheel, a revolving axle, a spindle, $i$, a disk, $d$, gear $a\ a'$, and socket H, the disks being arranged to overlap each other, and also to operate independently of each other in a vertical direction.

8. In an agricultural implement, a draft-frame, a socket, a spindle revolving within the socket, the spindle and socket adapted to oscillate up and down at their rear end, a smooth-edged disk or cutter rigidly attached to and revolving with the spindle, and mechanism for revolving a disk across the path of the machine.

9. A pole, a cross-bar, a drive-wheel, and a revolving axle, in combination with long and short drag-bars hinged to the axle and having a disk mounted on each bar, and mechanism on the axle for revolving the disks at right angles thereto.

10. In an agricultural implement, a draft-frame and disks mounted on supports which vibrate up and down independently of the draft-frame and of each other, and arranged so that the suction of the earth against their concave sides will draw them down, in combination with mechanism for revolving the disk transversely to the draft-line.

11. In an agricultural implement, a draft-frame and a cutting-disk revolving transversely to the draft-line on a drag-bar attached to the draft-frame, in combination with a weight-box supported on the drag-bar for enforcing the action of the disk.

CHARLES LA DOW.

In presence of—
 WM. P. RUDD,
 SPENCER C. RODGERS.